United States Patent
Kim et al.

(10) Patent No.: US 7,035,595 B1
(45) Date of Patent: Apr. 25, 2006

(54) CONFIGURABLE WIRELESS INTERFACE

(75) Inventors: Beomsup Kim, Cupertino, CA (US); Cormac Conroy, Sunnyvale, CA (US)

(73) Assignee: Berkana Wireless, Inc., Campbell, CA (US)

( * ) Notice: Subject to any disclaimer, the term of this patent is extended or adjusted under 35 U.S.C. 154(b) by 632 days.

(21) Appl. No.: 10/043,642

(22) Filed: Jan. 10, 2002

(51) Int. Cl.
*H04B 1/38* (2006.01)
*H04L 12/28* (2006.01)
*H04L 12/56* (2006.01)

(52) U.S. Cl. ..................................... 455/73; 370/395.5
(58) Field of Classification Search .................. 455/73, 455/456, 457; 341/155; 370/60.1, 395.3
See application file for complete search history.

(56) References Cited

U.S. PATENT DOCUMENTS 5,550,820 A * 8/1996 Baran ....................... 370/395.5

2002/0168988 A1 11/2002 Younis ........................ 455/456
2003/0034909 A1 2/2003 Wong ......................... 341/155

FOREIGN PATENT DOCUMENTS

WO   WO 03/061174   * 7/2005

* cited by examiner

*Primary Examiner*—William D. Cumming
(74) *Attorney, Agent, or Firm*—Van Pelt, Yi & James LLP (57) ABSTRACT

A multistandard RF transceiver is disclosed that may optionally include selectable mixers; selectable amplifiers; a configurable analog filter; and a configurable analog to digital converter. The multistandard RF transceiver may also include a data interface for sending data to a host controller and a control interface for receiving configuration commands from the host controller. The configuration commands identify a wireless standard that is to be implemented by the RF receiver. An RF processor processes an RF signal wherein the processed RF signal is output to the host controller on the data interface.

23 Claims, 9 Drawing Sheets

| | |
|---|---|
| Application ID | 402 |
| Low Noise Amplifier | 404 |
| Mixer | 406 |
| Local Oscillator/IF | 408 |
| Analog Filter Parameters | 410 |
| ADC Sample Rate | 416 |
| ADC Precision | 415 |
| Numerical Oscillator/Digital IF | 420 |
| Digital Filter Coefficients | 422 |
| Digital Filter Taps | 424 |
| Analog Interface | 426 |
| Timing and Formatting | 428 |

Figure 4A

| | |
|---|---|
| Application ID | 452 |
| Power Amplifier Driver | 454 |
| Mixer | 456 |
| Local Oscillator/IF | 458 |
| Analog Filter Parameters | 460 |
| DAC Sample Rate | 466 |
| DAC Precision | 468 |
| Numerical Oscillator/Digital IF | 470 |
| Digital Filter Coefficients | 472 |
| Digital Filter Taps | 474 |
| Analog Interface | 476 |

CONFIGURABLE WIRELESS INTERFACE

FIELD OF THE INVENTION

The present invention relates generally to wireless communication. More specifically, a configurable wireless interface is disclosed.

BACKGROUND OF THE INVENTION

With the increasing popularity of portable computing devices and wireless connectivity, there has been a proliferation of wireless communication standards and protocols. For example, a Personal Digital Assistant (PDA) may communicate with several other portable or non portable devices wirelessly and run wireless applications. Such a PDA may at different times (and in some cases, concurrently) implement WLAN, BLUETOOTH™ (a short-range wireless radio technology), GPS, Cellular, Cordless or other RF applications. Currently, each such application requires its own software and hardware and as a result each application that is enabled contributes individually to the cost of the portable device. In addition, each application is generally configured in the device before the device is sold, or in some cases purchased as a hardware add on.

It would be very useful if a device could be developed that could be configured and reconfigured to implement different wireless applications and protocols as desired. Furthermore, if such a device could use common hardware or reconfigurable software resources to implement different protocols or applications, then the cost of potentially including a large selection of applications in a device could be reduced. What is needed, therefore, is a configurable wireless interface that could be included in a device to allow that device to be configured to run multiple wireless applications.

SUMMARY OF THE INVENTION

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

A configurable wireless interface is disclosed. In one embodiment, a multistandard RF receiver includes a plurality of selectable mixers; a plurality of selectable amplifiers; a configurable analog filter; and a configurable analog to digital converter.

In one embodiment, a multistandard RF transmitter includes a plurality of selectable mixers; a plurality of selectable amplifiers; a configurable analog filter; and a configurable analog to digital converter.

In one embodiment, a multistandard RF receiver includes a data interface for sending data to a host controller and a control interface for receiving configuration commands from the host controller. The configuration commands identify a wireless standard that is to be implemented by the RF receiver. An RF processor processes an RF signal wherein the processed RF signal is output to the host controller on the data interface.

In one embodiment, a multistandard RF transmitter includes a data interface for receiving data from a host controller and a control interface for receiving configuration commands from the host controller. The configuration commands identify a wireless standard that is to be implemented by the RF transmitter. An RF processor processes an RF signal. The processed RF signal is transmitted in accordance with the wireless standard.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
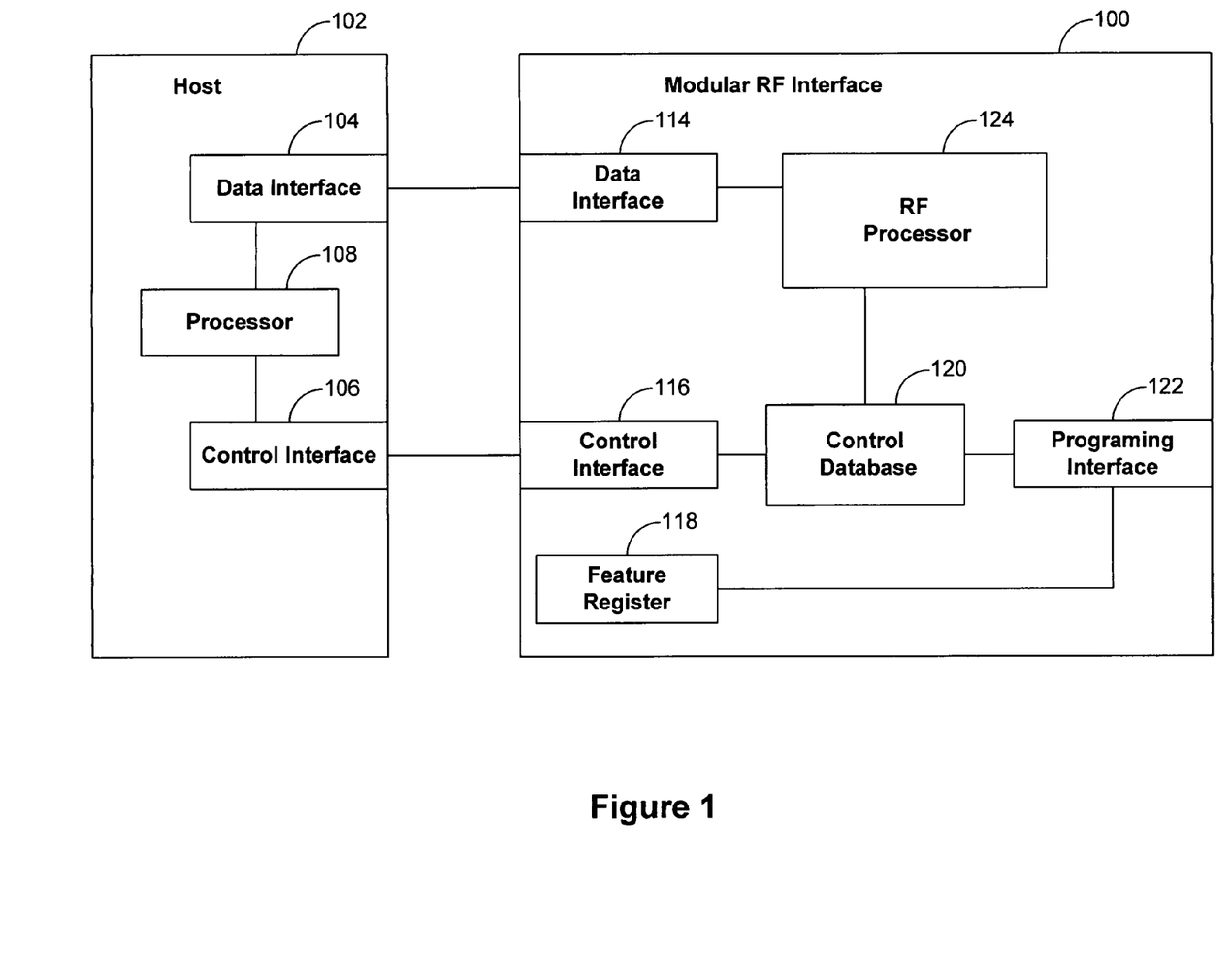
FIG. 1 is a block diagram illustrating how a modular RF interface interacts with a host.

FIG. 1 is a block diagram illustrating how a modular RF interface 100 interacts with a host 102. Host 102 includes a data interface 104 and a control interface 106. Host processor 108 uses control interface 106 to first determine the features that are enabled for modular RF interface 100 and then to select a feature. Host processor 108 then uses data interface 104 to send data to the modular RF interface for transmission and to receive data from the modular RF interface.

Modular RF interface 100 likewise includes a data interface 114 and a control interface 116. Modular RF interface 100 also includes a feature register 118 that communicates with control interface 116 and is described further in FIG. 3. Feature register 118 stores a code that indicates features that have been programmed into the modular RF interface. Control interface 116 also communicates with control database 120 to select a feature when a feature selection is made by the host processor. Control database 120 includes a table for each application that may be selected that includes various parameters used to program the modular RF interface to support the selected application.

In some embodiments, programming interface 122 is provided to write new application tables to control database 120 or to edit existing application tables. By loading new parameters for an application, the modular RF interface can be configured to support a new application or an updated existing application without a hardware change. The RF interface is engineered or re-engineered by software input to the programming interface. This flexible design allows new applications to be installed in the modular RF interface and made available to the host by simply downloading the required parameters.

It should be noted that programming interface 122 may logically and/or physically be a separate interface as shown in FIG. 1 or may alternatively be implemented as part of control interface 116. A special code or sequence may be used to indicate a programming mode where the control database is being updated instead of an operating mode where an application table is being selected to obtain parameters for loading into the modular RF interface. It should also be noted that in some embodiments, the control database is not programmable and is contained in ROM that is configured before the chip is sold and is not writeable. However, the ability to program new applications and modify old applications on the modular RF interface and therefore potentially add new functionality to the modular RF interface and the host is an important feature in many embodiments.

When an application table is selected, the data from the table is used to configure various devices included in RF processor 124. RF processor 124, once configured, receives data from the host via data interface 114 for transmission and/or receives a signal from an antenna for processing and returns the processed signal to the host. Data interface 114 may be any suitable interface capable of exchanging data between the host and the modular RF interface. In one embodiment, data interface 114 is a serial interface. In embodiments that plug the modular RF interface into a legacy application, data interface 114 may include a remodulator that recreates a signal that is processed by a conventional baseband processor on the host.

Figure 2A:
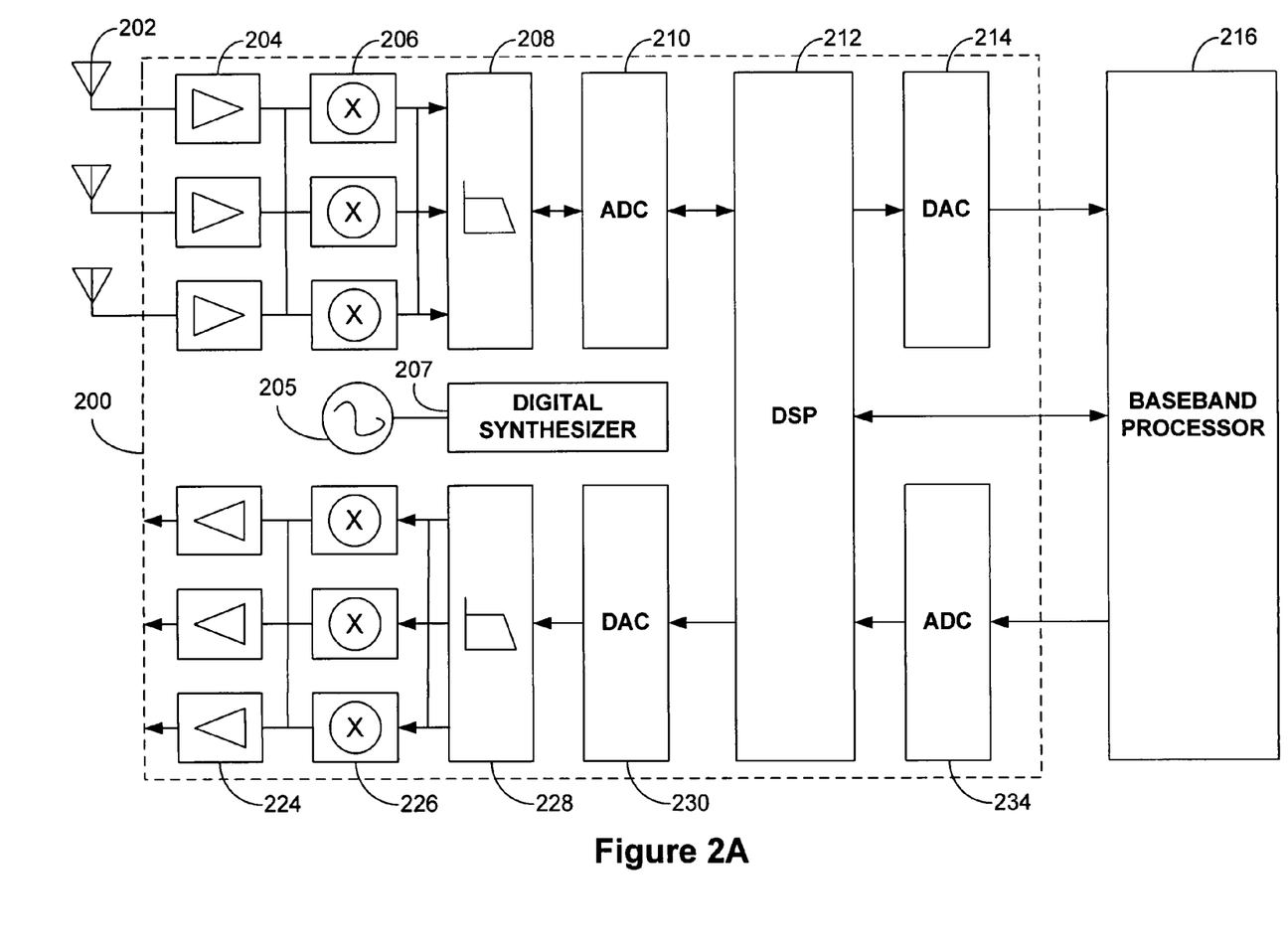
FIG. 2A is a diagram illustrating an architecture used in one embodiment of a modular wireless interface that includes an RF/IF system with both a transmitter and a receiver.

FIG. 2A is a diagram illustrating an architecture used in one embodiment of a modular wireless interface that includes an RF/IF system with both a transmitter and a receiver. Preferably, this system is contained on a single chip 200. In one embodiment, the system is implemented on separate chips with a high speed interface provided between the chips. It should be noted that in some embodiments, a transmitter only or a receiver only may be implemented.

On the transmit side, in the embodiment shown, three possible antenna inputs 202 are shown. The signal paths from each of the antennas are shown separately through amplifiers 204 which are preferably low noise amplifiers and mixers 206 which are driven by local oscillator 205 controlled by a digital synthesizer 207. In some embodiments, a common amplifier may be used by the different antennas by implementing a series of switches to select the desired antenna. Likewise, in some embodiments, a common antenna may be shared by different amplifiers by implementing a series of switches or other appropriate arrangement.

It should be noted that in other embodiments, different numbers of signal paths may be included. Also, in some embodiments, a signal path may be used for more than one application. For example, one signal path may be used for GSM, GPRS, and EDGE. In general, the low noise amplifier and the mixer are determined by the frequency band of the application or wireless protocol that is being implemented. Applications that may be implemented in a signal path include WCDMA, or GSM, GPRS, and EDGE or TDMA, CDMA and CDMA 2000-xx or wireless LANs, BLUETOOTH™ (a short-range wireless radio technology), cordless phones and GPS or DCS 1800 and PCS or PCS 1900. Other applications may be included as well.

Filter 208 receives a signal from the selected signal path that includes a selected amplifier and mixer. Filter 208 is programmed according to a selected application to appropriately provide anti aliasing and/or image rejection. In one embodiment, filter 208 is a low pass filter and the frequency cutoff is programmed according to the selected application. Filter 208 may also be a bandpass filter. In one embodiment, filter 208 is an active or passive RC filter and a switchable array of capacitors or resistors or both is programmed to select the required components for a given response. The output of filter 208 is input to an analog to digital converter (ADC) 210. The digital output of ADC 210 is processed by a digital signal processor (DSP) 212. DSP 212 is reconfigurable and is programmed to process the signal in a manner that varies with the selected application. In general, DSP 212 processes both I and Q channel signals received from ADC 210. DSP 212 may also be configured to process a signal that is being transmitted.

In some embodiments, the signal is not converted all the way down to baseband in the analog domain and DSP 212 includes a numerical oscillator that down converts the signal in the digital domain the remainder of the way to baseband from the intermediate frequency achieved by the selected mixer and digitally controlled local oscillator.

In one embodiment, DSP 212 is configured to perform all baseband processing of the signal. However, in different embodiments, various signal processing functions may be performed off chip by a host processor. For example, voice processing, coding/decoding, and error correction may be performed on the host processor while modulation and demodulation, equalization and filtering are performed by the on chip transceiver using DSP 212. A host controller function may be implemented partly on chip and partly on the host. In certain embodiments, for the purpose of communicating with a legacy system that includes a baseband processor configured to receive an analog IF signal input, DAC 214 is provided to remodulate the signal to communicate with baseband processor 216. The baseband processor preferably is implemented on the host. In some embodiments, a dedicated baseband processor chip may be used.

In a similar manner, the transmit side includes programmable components that are configured to work with different applications such as the ones listed above as well as separate components included in alternative signal paths. An analog signal may be received from baseband processor 216 if a legacy device is being used. ADC 234 converts an analog input to a digital signal to be processed by DSP 212. Alternatively, a digital signal may be input to the chip using a suitable digital interface. DSP 212 encodes and/or modulates the signal according to the selected application and provides an output to DAC 230. The output of DAC 230 is filtered by a programmable analog filter 228. The output of filter 228 is selectably routed to a signal path that includes a mixer 226 and an amplifier 224. The output of amplifier 224 is sent to a transmit antenna or transmitting system. In some embodiments, the separate signal paths may be combined.

In some embodiments, the transmitter may additionally be reconfigured to include digital up conversion. Also, the transmitter mode may be switched to a translational loop architecture for constant envelope modulation schemes such as GSM.

Figure 2B:
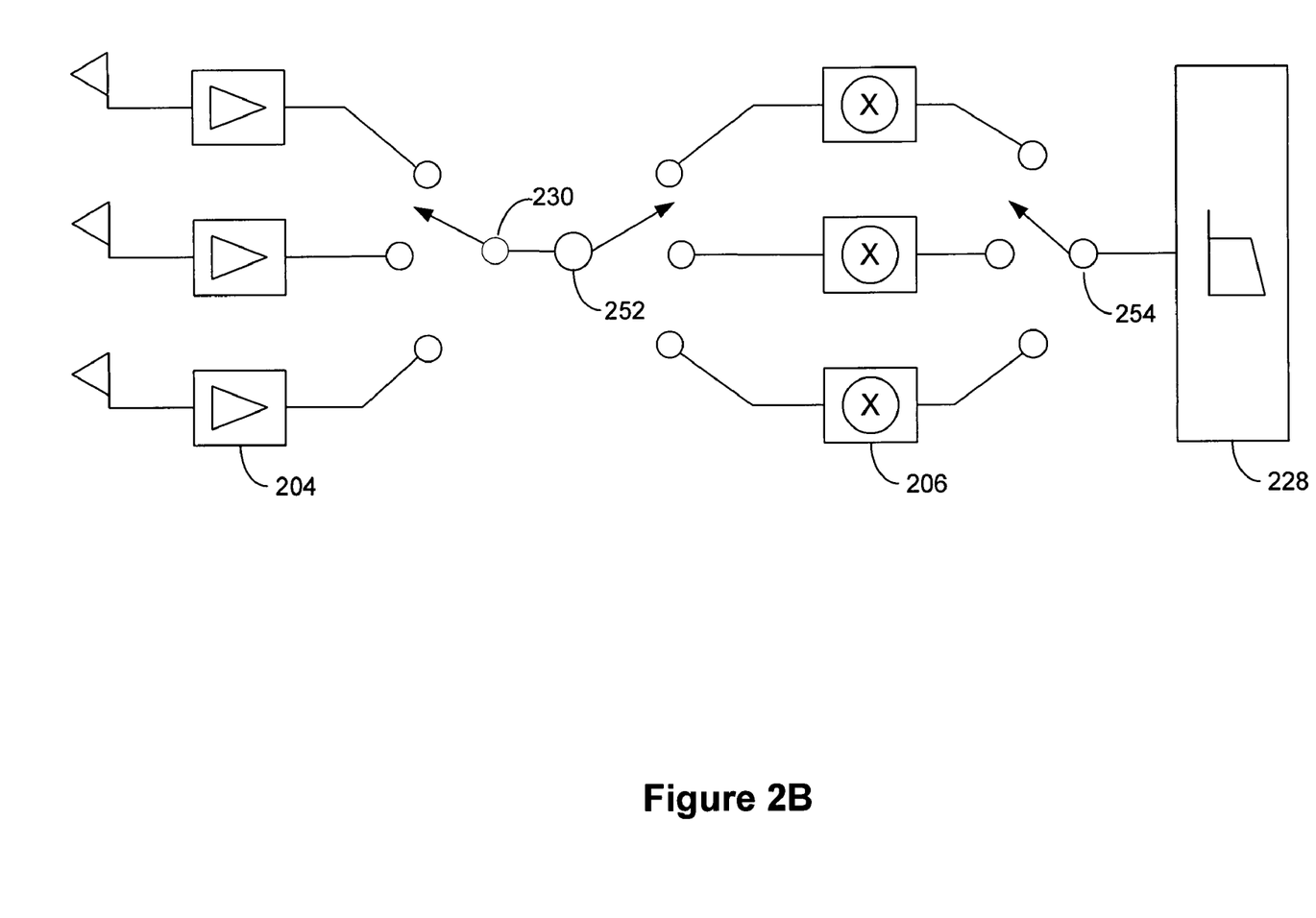
FIG. 2B is a diagram illustrating in detail a configurable signal path between the amplifiers, mixers, and digital filter shown in FIG. 2A on the receive side.

FIG. 2B is a diagram illustrating in detail a configurable signal path between the amplifiers, mixers, and digital filter shown in FIG. 2A on the receive side. Switch 250 selects an amplifier and switches 252 and 254 select a mixer. Other signal paths are used in other embodiments. For example, the mixer and amplifier may be selected as a pair.

Figure 2C:
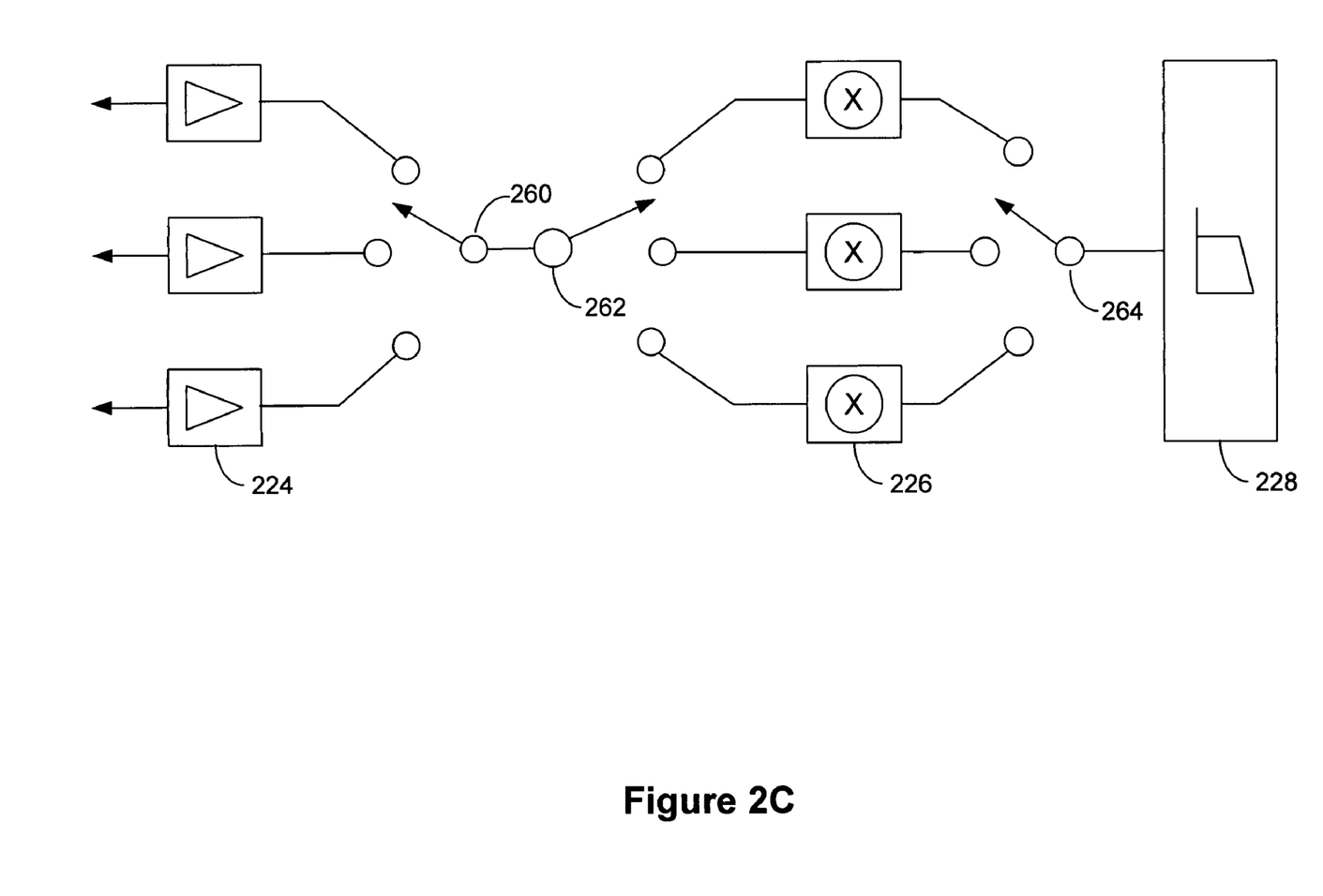
FIG. 2C is a diagram illustrating in detail a configurable signal path between the amplifiers, mixers, and digital filter shown in FIG. 2A on the transmit side.

FIG. 2C is a diagram illustrating in detail a configurable signal path between the amplifiers, mixers, and digital filter shown in FIG. 2A on the transmit side. Switch 260 selects an amplifier and switches 262 and 264 select a mixer. Other signal paths are used in other embodiments. For example, the mixer and amplifier may be selected as a pair.

The transceiver architecture shown shows a configurable signal path using switches as well as individually configurable components that are reprogrammed and reused in different modes. In other embodiments, the signal path is configured in other manners and different configurable components may be selected. However, the benefit of reusing certain components is still enjoyed. In particular, the common DSP greatly reduces the amount of area required to implement the different protocols.

Figure 3:
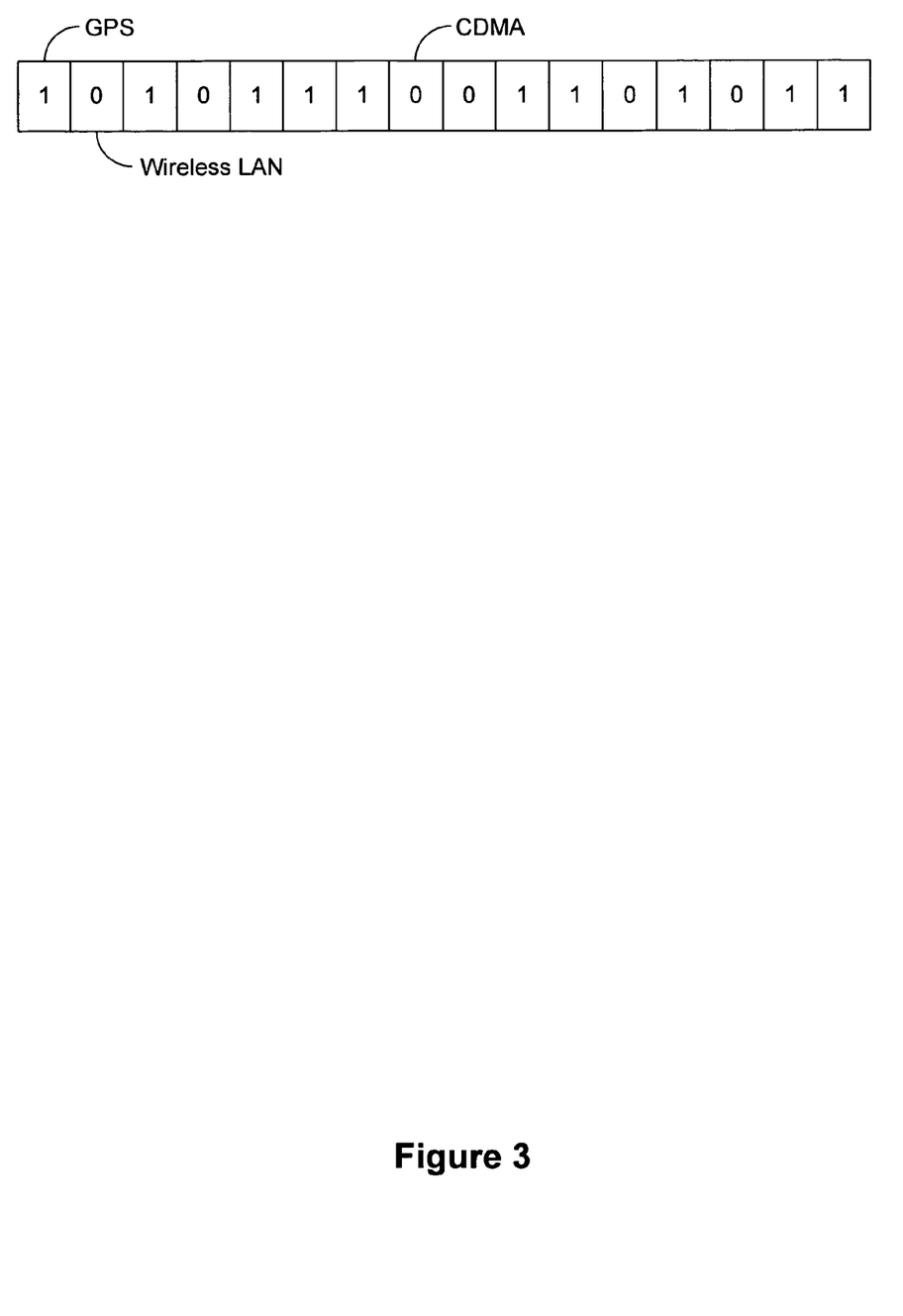
FIG. 3 is a diagram illustrating a feature register included in the modular RF interface.

FIG. 3 is a diagram illustrating a feature register included in the modular RF interface. For the purpose of illustration, a 16 bit register is shown wherein each bit corresponds to an application that may be implemented by the modular RF interface. In other embodiments, applications may be represented by more complex codes for the purpose of security. In the example shown, bits are labeled that correspond to a GPS, a wireless LAN, and a CDMA feature.

Figure 4A:
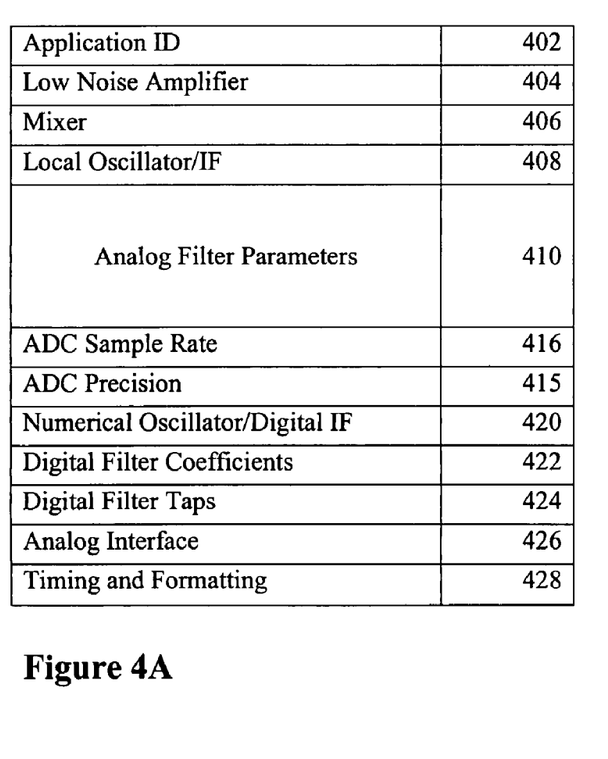
FIG. 4A is a diagram illustrating an application table for the transmit side included in a control database as shown in FIG. 1.

FIG. 4A is a diagram illustrating an application table for the transmit side included in control database 120 as shown in FIG. 1. The application table includes various parameters that are used to either select a signal path by switching between amplifiers and mixers or to configure components such as a filter, an ADC or a DAC. Application table 400 includes an application ID 402 that is used to match an application ID specified by the host for the purpose of selecting the application table. A low noise amplifier identifier 404 selects a low noise amplifier and a mixer identifier 406 selects a mixer. A local oscillator/IF identifier specifies an IF and selects or programs a local oscillator. Identifiers 402, 404, and 406 select or configure the signal path that leads to the programmable analog filter as shown in FIG. 4A.

The programmable analog filter is programmed according to filter parameters 410 which define the analog filter response. It should be noted that each of the parameters shown may be an array of parameters or a pointer to a data structure that contains the parameter or set of parameters.

The ADC is configured according to the ADC parameters 416 and 418. Parameter 416 specifies the ADC sample rate and Parameter 418 specifies the ADC precision. Other ADC parameters are specified in other embodiments. By specifying the filter parameters and the ADC parameters, the filter and ADC are configured to operate for different applications. The reuse of the ADC and filter components for different applications greatly reduces the cost of the modular RF interface.

If a digital down conversion is performed, then parameter 420 may be used to specify a numerical oscillator or digital IF. Digital filter parameters may also be specified. For example, parameter 422 specifies digital filter coefficients; and parameter 424 specifies digital filter taps.

If a DAC is used after the DSP to generate an analog signal for a legacy interface to communicate with the baseband processor, then analog interface identifier 426 may be included to indicate the type of analog waveform that is to be generated. In general, different analog waveforms may be generated for different types of baseband processors. In one embodiment, either a digital or an analog PLL is used to generate a timing signal for the legacy or digital interface. A digital or analog PLL may be used with the DAC or digital interface for the baseband or host processor and support various types of timing and data formatting. The PLL can generate different phase or frequency through programming. Parameter 428 is used to program various kinds of timing and data formatting.

Figure 4B:
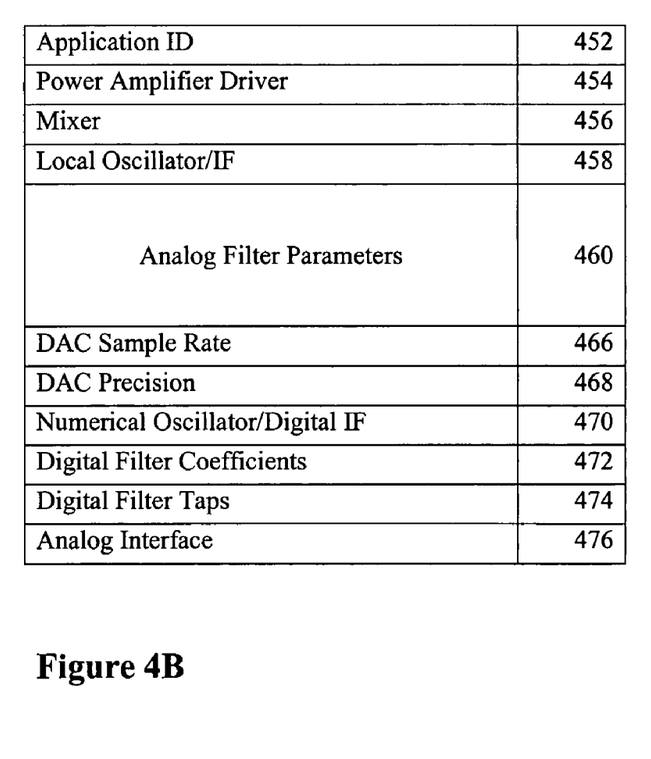
FIG. 4B is a diagram illustrating an application table for the transmit side included in a control database as shown in FIG. 1.

FIG. 4B is a diagram illustrating an application table for the transmit side included in control database 120 as shown in FIG. 1. The application table includes various parameters that are used to either select a signal path by switching between amplifiers and mixers or to configure components such as a filter, an ADC or a DAC. Application table 450 includes an application ID 452 that is used to match an application ID specified by the host for the purpose of selecting the application table. A power amplifier driver identifier 454 selects a low noise amplifier and a mixer identifier 456 selects a mixer. A local oscillator/IF identifier specifies an IF and selects or programs a local oscillator. Identifiers 452, 454, and 456 select or configure the signal path that leads to the programmable analog filter as shown in FIG. 4A.

The programmable analog filter is programmed according to filter parameters 460 which define the analog filter response. It should be noted that each of the parameters shown may be an array of parameters or a pointer to a data structure that contains the parameter or set of parameters.

The DAC is configured according to the DAC parameters 416 and 418. Parameter 416 specifies the DAC sample rate and Parameter 418 specifies the DAC precision. Other DAC parameters are specified in other embodiments. By specifying the filter parameters and the DAC parameters, the filter and DAC are configured to operate for different applications. The reuse of the DAC and filter components for different applications greatly reduces the cost of the modular RF interface.

If a digital up conversion to a digital IF is performed, then parameter 420 may be used to specify a numerical oscillator or digital IF. Digital filter parameters may also be specified. For example, parameter 422 specifies digital filter coefficients; and parameter 424 specifies digital filter taps. If an ADC is used before the DSP in the transmit path to receive an analog signal from the baseband processor, then analog interface identifier 476 may be included to indicate the type of analog waveform is to be received. In general, different analog waveforms may be generated by different types of baseband processors. In one embodiment, either a digital or an analog PLL is used to generate a timing signal for the legacy or digital interface. A digital or analog PLL may be used with the ADC or digital interface to receive the data from the baseband or host processor and provide various type of timing and identify the data formatting. The PLL can generate different phase or frequency through programming. Parameter 4478 is used to program various kind of timing and data formatting.

It should be noted that in other embodiments, different data structures are used to configure or select components for the modular RF interface. The disclosed table format is one of many structures that may be used as is deemed appropriate for a specific system.

In a similar manner, identifiers and parameters are also specified on the transmit side so that the transmit signal path is selected and the transmit DAC and analog filter are configured.

Figure 5:
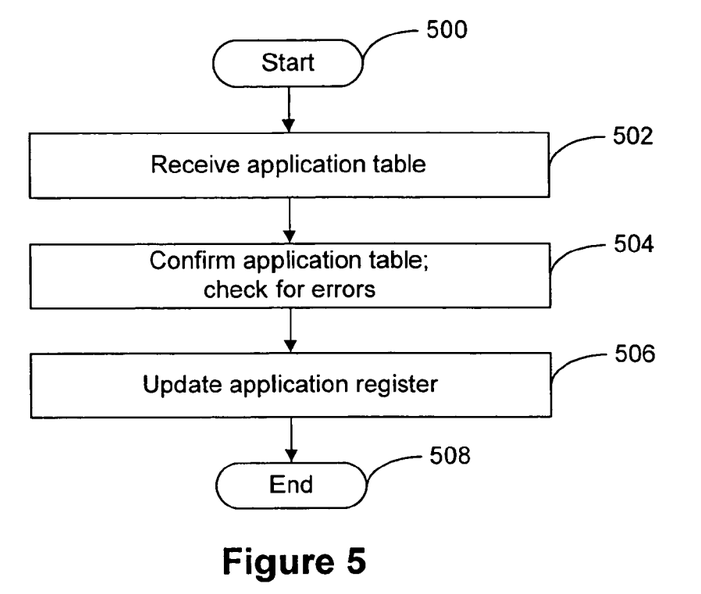
FIG. 5 is a flow chart illustrating a process for programming the modular RF interface to include a new application by adding a new application table.

FIG. 5 is a flow chart illustrating a process for programming the modular RF interface to include a new application by adding a new application table. The process starts at 500. In step 502, the new application table is received. Next, in step 504, the application table is confirmed or checked for errors. Any standard technique for doing this may be implemented including hashing the table and checking the hash value. In step 506, the application register (as shown in FIG. 3) is updated to indicate that the new application is available on the modular RF interface.

Figure 6:
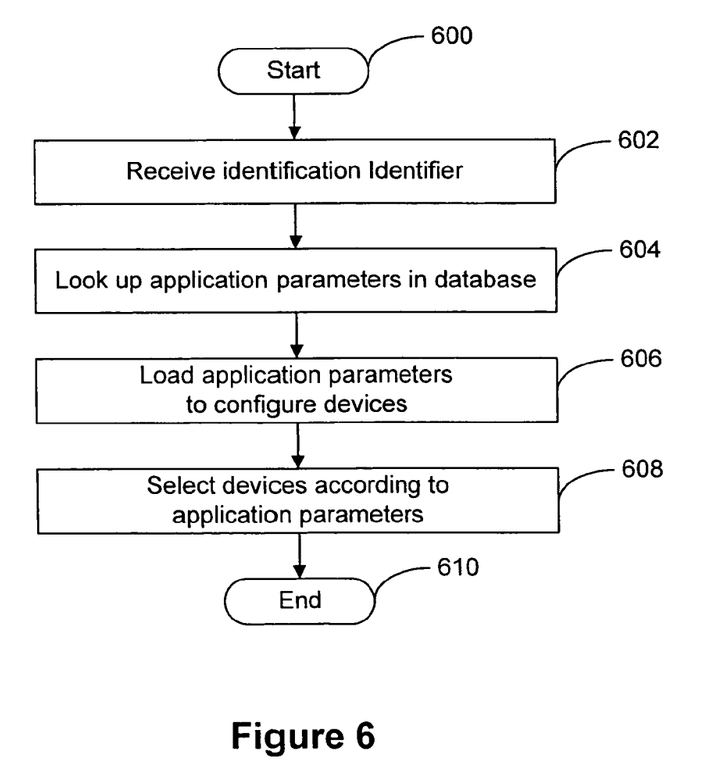
FIG. 6 is a flow chart illustrating a process for configuring the modular RF interface to implement a selected application.

FIG. 6 is a flow chart illustrating a process for configuring the modular RF interface to implement a selected application. The process starts at 600. In step 602, an application identifier is received. In step 604, application parameters are retrieved from the application table that corresponds to the application identifier. In step 606, the application parameters are loaded to configure devices. Finally, in step 608, devices are selected according to the application parameters. The process ends at 610.

Figure 7:
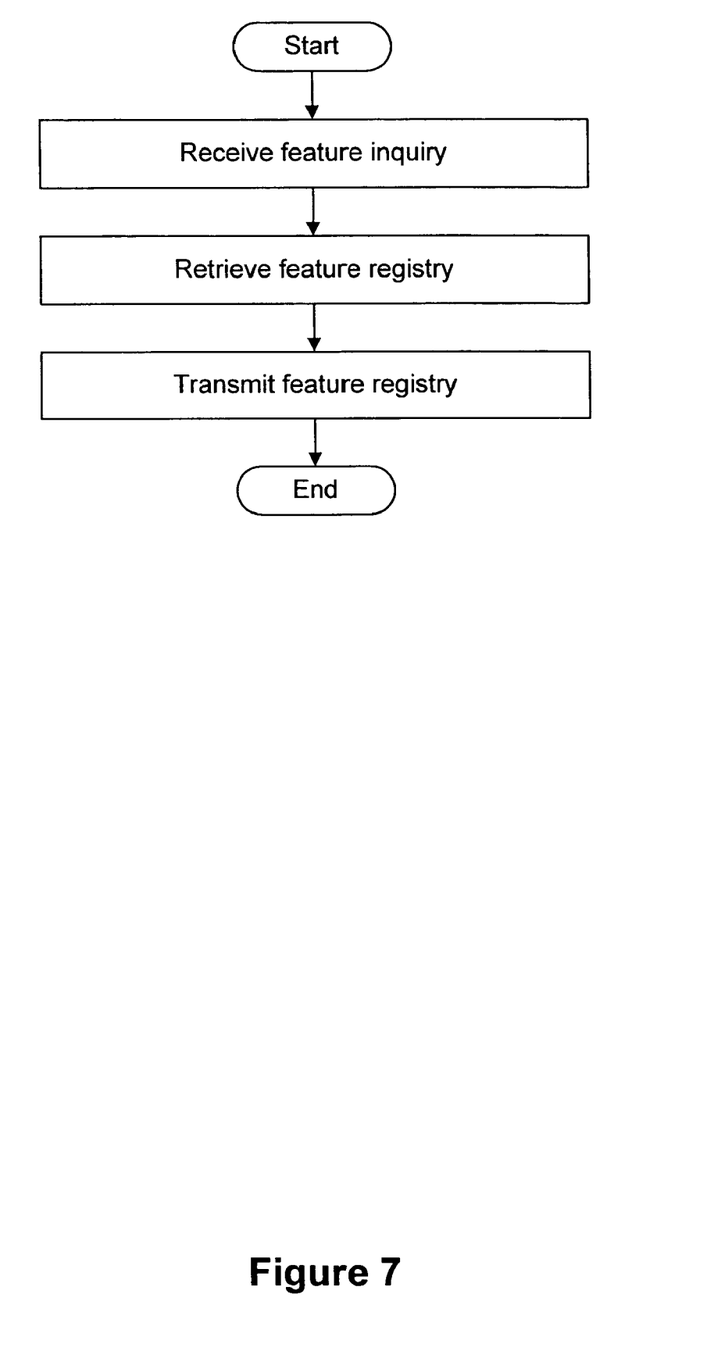
FIG. 7 is a flow chart illustrating a process for the modular RF interface reporting to a host the features that are available.

FIG. 7 is a flow chart illustrating a process for the modular RF interface reporting to a host the features that are available. The process starts at 700. In step 702, an inquiry for the feature registry is received. In step 704, the feature registry is retrieved. In step 706, the feature registry is transmitted. The process ends at 708. It should be noted that in some embodiments, the feature registry may be directly accessed by the host.

Figure 8:
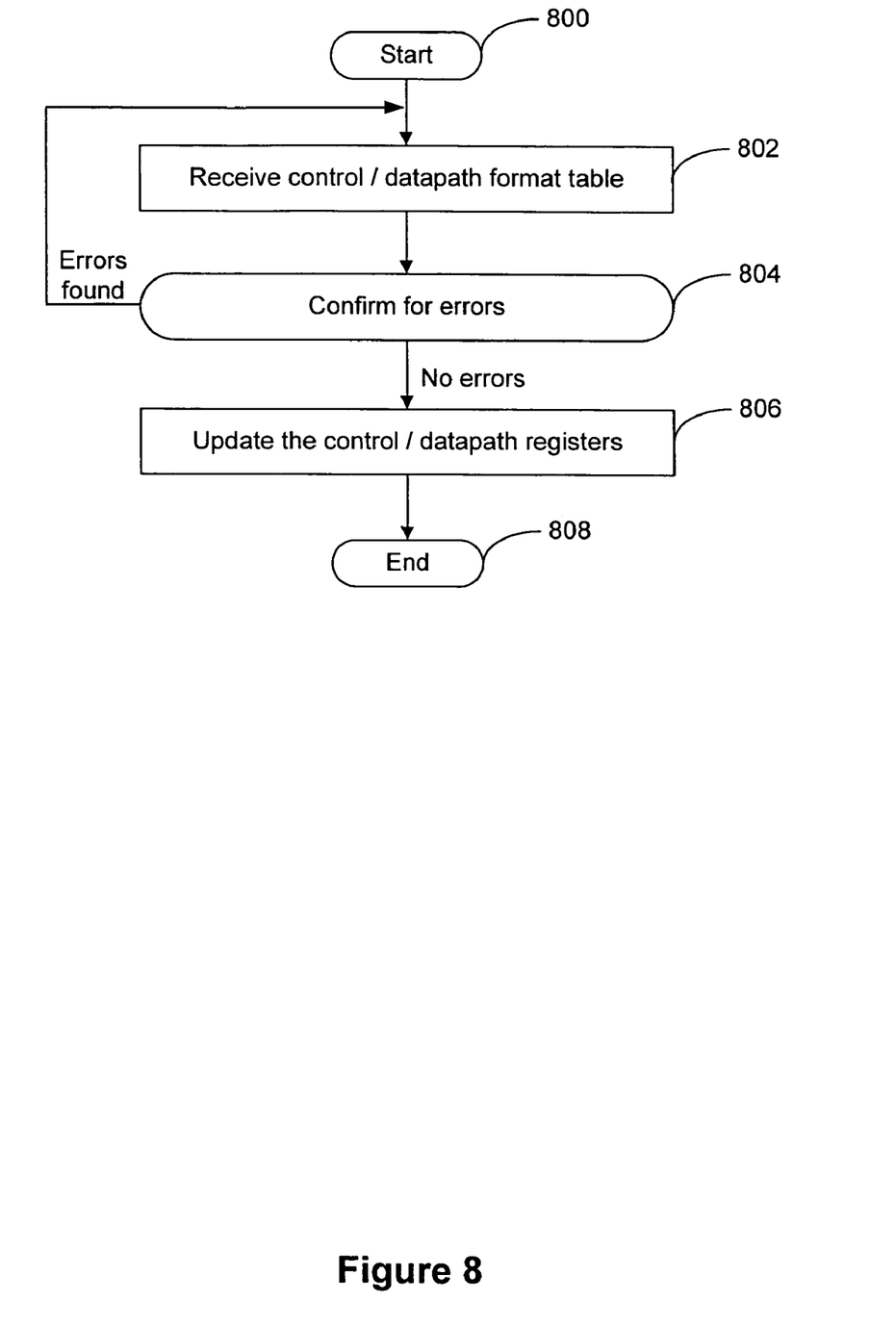
FIG. 8 is a flow chart illustrating a process for the programming of the control interface.

In some embodiments, depending on the host or baseband processor, it may be desirable to program the control/data interface, protocol or signaling. The programming interface supports this programming. FIG. 8 is a flow chart illustrating a process for the programming of the control interface. The process starts at 800. In a step 802, a control/data path format table is received. In step 804, the table is checked for errors. If errors are found, then the system waits until a correct format table is received. In some embodiments, the system requests that the format table be resent. The system also may fail to acknowledge the table and then wait for the format table to be resent. Once the table is confirmed, the control/data path registers are updated in step 806. The process ends at 808.

A modular RF interface has been described. The modular RF interface is configurable to support different applications by selecting a set of stored parameters that select a signal path and configure components. The modular RF interface may be programmed to support additional applications by loading in configuration data for such applications.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A multistandard RF receiver comprising:
a plurality of selectable mixers;
a plurality of selectable amplifiers;
a configurable analog filter; and
a configurable analog to digital converter.

2. A multistandard RF transmitter comprising:
a plurality of selectable mixers;
a plurality of selectable amplifiers;
a configurable analog filter; and
a configurable digital to analog converter.

3. A multistandard RF receiver comprising:
a data interface for sending data to a host controller;
a control interface for receiving configuration commands from the host controller wherein the configuration commands identify a wireless standard that is to be implemented by the RF receiver; and
an RF processor for processing an RF signal wherein the processed RF signal is output to the host controller on the data interface;
wherein the RF receiver includes a configurable signal path.

4. A multistandard RF receiver comprising:
a data interface for sending data to a host controller;
a control interface for receiving configuration commands from the host controller wherein the configuration commands identify a wireless standard that is to be implemented by the RF receiver; and
an RF processor for processing an RF signal wherein the processed RF signal is output to the host controller on the data interface;
wherein the RF receiver includes a configurable analog filter.

5. A multistandard RF receiver comprising:
a data interface for sending data to a host controller;
a control interface for receiving configuration commands from the host controller wherein the configuration commands identify a wireless standard that is to be implemented by the RF receiver; and
an RF processor for processing an RF signal wherein the processed RF signal is output to the host controller on the data interface;
wherein the RF receiver includes configurable analog to digital converter.

6. A multistandard RF comprising:
a data interface for sending data to a host controller;
a control interface for receiving configuration commands from the host controller wherein the configuration commands identify a wireless standard that is to be implemented by the RF receiver; and
an RF processor for processing an RF signal wherein the processed RF signal is output to the host controller on the data interface;
wherein the RF receiver includes a plurality of selectable mixers.

7. A multistandard RF receiver comprising:
a data interface for sending data to a host controller;
a control interface for receiving configuration commands from the host controller wherein the configuration commands identify a wireless standard that is to be implemented by the RF receiver; and an RF processor for processing an RF signal wherein the processed RF signal is output to the host controller on the data interface;

wherein the RF receiver includes a plurality of selectable amplifiers.

8. A multistandard RF transmitter comprising:

a data interface for receiving data from a host controller;

a control interface for receiving configuration commands from the host controller wherein the configuration commands identify a wireless standard that is to be implemented by the RF transmitter; and an RF processor for processing an RF signal wherein the processed RF signal is transmitted in accordance with the wireless standard;

wherein the RF transmitter includes a configurable signal path.

9. A multistandard RF transmitter comprising:

a data interface for receiving data from a host controller;

a control interface for receiving configuration commands from the host controller wherein the configuration commands identify a wireless standard that is to be implemented by the RF transmitter; and an RF processor for processing an RF signal wherein the processed RF signal is transmitted in accordance with the wireless standard;

wherein the RF transmitter includes configurable components.

10. A multistandard RF transmitter comprising:

a data interface for receiving data from a host controller;

a control interface for receiving configuration commands from the host controller wherein the configuration commands identify a wireless standard that is to be implemented by the RF transmitter; and an RF processor for processing an RF signal wherein the processed RF signal is transmitted in accordance with the wireless standard;

wherein the RF transmitter includes a configurable analog filter.

11. A multistandard RF transmitter comprising:

a data interface for receiving data from a host controller;

a control interface for receiving configuration commands from the host controller wherein the configuration commands identify a wireless standard that is to be implemented by the RF transmitter; and an RF processor for processing an RF signal wherein the processed RF signal is transmitted in accordance with the wireless standard;

wherein the RF transmitter includes configurable digital to analog converter.

12. A multistandard RF transmitter comprising:

a data interface for receiving data from a host controller;

a control interface for receiving configuration commands from the host controller wherein the configuration commands identify a wireless standard that is to be implemented by the RF transmitter; and an RF processor for processing an RF signal wherein the processed RF signal is transmitted in accordance with the wireless standard;

wherein the RF transmitter includes a plurality of selectable mixers.

13. A multistandard RF transmitter comprising:

a data interface for receiving data from a host controller;

a control interface for receiving configuration commands from the host controller wherein the configuration commands identify a wireless standard that is to be implemented by the RF transmitter; and an RF processor for processing an RF signal wherein the processed RF signal is transmitted in accordance with the wireless standard;

wherein the RF transmitter includes a plurality of selectable amplifiers.

14. A multistandard RF transceiver comprising:

a plurality of selectable mixers;

a plurality of selectable amplifiers; and a configurable digital signal processor that is configured to process a received signal or a signal that is being transmitted.

15. A method of processing an RF signal including:

receiving configuration information from a host processor;

configuring a signal path in accordance with the configuration information; and configuring components in accordance with the configuration information.

16. A host processor for interacting with a multistandard RF transceiver comprising:

a data interface for transmitting data to and receiving data from the multistandard RF transceiver; and a control interface for sending configuration information to the multistandard RF transceiver;

wherein the host processor receives information from the multistandard RF transceiver indicating the standards that are supported by the multistandard RF transceiver for interacting with a host processor.

17. A multistandard RF receiver comprising:

an RF processor for processing an RF signal;

a digital to analog converter for converting the processed RF signal to a digital signal;

a digital signal processor for manipulating the digital signal; and a programmable interface for outputting the processed signal.

18. A multistandard RF receiver as recited in claim 17 wherein the programmable interface includes a digital to analog converter for generating an analog signal.

19. A multistandard RF receiver as recited in claim 17 wherein the programmable interface includes a programmable PLL.

20. A multistandard RF transmitter comprising:

a programmable interface for receiving a signal to be transmitted;

a digital signal processor for outputting a procesed signal from the programmable interface for transmitting;

an analog to digital converter for converting the processed signal to an analog signal; and an RF processor for processing the analog signal.

21. A multistandard RF transmitter as recited in claim 20 wherein the programmable interface includes an analog to digital converter for converting the signal to be transmitted to a digital signal.

22. A multistandard RF transmitter as recited in claim 20 wherein the programmable interface includes a programmable PLL.

23. A multistandard RF transceiver comprising:

a modular RF interface;

a control database having parameters for programming the RF interface:

a programming interface configured to receive updates for the control database;

wherein the programming interface is activated by a code that indicates that the control database is to be updated.

* * * * *